United States Patent [19]

Hammel et al.

[11] 4,153,546

[45] May 8, 1979

[54] METHOD AND APPARATUS FOR SEPARATING SOLVENT FROM SOLUTE

[75] Inventors: Harold T. Hammel, Del Mar; James E. Maggert, San Diego, both of Calif.

[73] Assignee: The Regents of the University of California, Berkeley, Calif.

[21] Appl. No.: 851,918

[22] Filed: Nov. 16, 1977

[51] Int. Cl.² ............................................. B01D 17/00
[52] U.S. Cl. ....................................... 210/41; 210/72; 210/176
[58] Field of Search .................. 210/22, 31 C, 68, 72, 210/176, 198 C, 321 R, 502, 24, 40, 41

[56] References Cited

U.S. PATENT DOCUMENTS

| 2,541,071 | 2/1951 | Jones et al. | 210/72 |
| 2,712,386 | 7/1955 | Jones et al. | 210/22 |
| 2,892,544 | 6/1959 | Jones | 210/72 |
| 3,664,095 | 5/1972 | Asker et al. | 210/502 |

*Primary Examiner*—Charles N. Hart
*Assistant Examiner*—Ivars Cintis
*Attorney, Agent, or Firm*—Nilsson, Robbins, Dalgarn, Berliner, Carson & Wurst

[57] ABSTRACT

A method and apparatus for separating a volatile solvent from a solution of the solvent and a relatively non-volatile solute. A temperature gradient is provided across solvent-absorbing and gas-entraining matrix material infiltrated with the solution, resulting in concentration of the solution near the hotter matrix surface and dilution of the solution near the cooler matrix surface. The process lends itself to the desalination of sea water and to applications which require the recovery of either solute or solvent.

33 Claims, 1 Drawing Figure

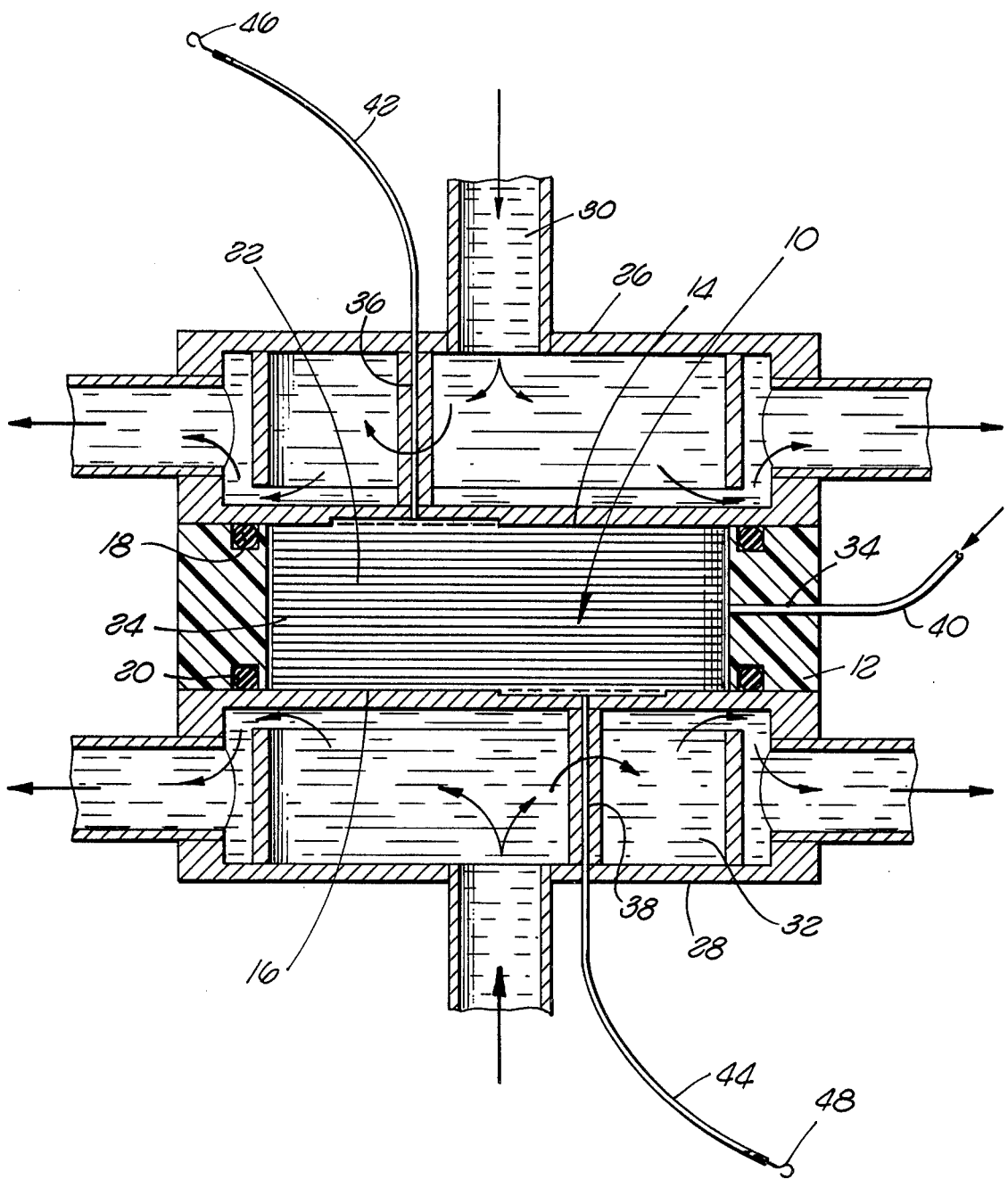

METHOD AND APPARATUS FOR SEPARATING SOLVENT FROM SOLUTE

FIELD OF THE INVENTION

The field of art to which the invention pertains includes methods and apparatus for solute-solvent concentration and separation.

BACKGROUND AND SUMMARY OF THE INVENTION

Techniques developed for the concentration or separation of a solute from its solution are often so expensive and energy-consuming that their application, on a large scale, is limited to the production of substances whose economic, political or social value transcends the criteria of the market place. The desalination of sea water, for example, for the production of potable water or irrigation water for crops, is at present practicable only in a very few arid regions. Different approaches including distillation, electrodialysis based on ion exchange, reverse osmosis using the concentration potential, or vacuum freezing, cannot as yet provide a return that is generally commensurate with the required large investment of capital and energy. Materials problems, such as the difficulty of fabricating durable membranes of the required separating capacity have not yet been satisfactorily solved. In desalination, efficiency of the various technologies are adversely affected by the need to protect machinery against corrosion and scaling, and to absorb or dispose of the process heat before it is added to the environment. Similar considerations impede in many cases the development of large-scale purification, separation and concentration techniques for solutions of diverse composition.

The present invention provides a novel method for effectively concentrating and separating a solute, but requiring only simple apparatus operating under ambient pressure and using relatively low temperatures. The procedure is generally applicable to the separation of a volatile solvent from a solute or to the concentration of a solution with solute and is particularly adaptable for the desalination of sea water.

Specifically, the present invention proceeds by infiltrating solvent-absorbing and gas-entraining matrix material with a solution to be separated and providing a temperature gradient across the matrix material to define hotter and cooler sides. An example of suitable matrix material is stacked sheets of filter paper. As a result of the temperature gradient, which need not be large, a large solute concentration gradient is induced across the matrix material so that solution concentrated with solute can be removed from the hotter side while solution diluted with solvent can be removed from the cooler side. Apparatus provided herein includes a chamber for containing the matrix material and which is formed with appropriate inlet and outlet ports and means for infusing solution into the matrix material.

In its experimental laboratory form, the present process uses apparatus which superficially resembles a Soret cell. In such a cell, a temperature gradient is applied across a solution maintained between a heated upper wall and a cooler lower wall and tends to develop a solute concentration gradient across the solution which is set up by thermal diffusion. The concentration gradient is a function of the solute, its concentration and the temperature and invariably concentrates the solution with solute at the cooler side. The result is that the Soret coefficient is negative, corresponding to a ratio of solute concentration between the heated and cooled surfaces of the Soret cell which is less than unity. Some typical Soret coefficients for different solutions are included in the publication by H. J. V. Tyrell: "Thermal Diffusion Phenomena in the Electrolytes and the Constants Involved," *U.S. National Bureau of Standards Circular* 524, 119–130 (1953).

The negative nature of the Soret coefficient indicates that the solute component of the solution concentrates at the cooler side. In direct contrast, in accordance with the present invention, by the introduction of a matrix with solvent-absorbing and gas-entraining properties, we have found coefficients which are positive and extraordinarily large. The development of large positive coefficients represents a complete reversal of the concentration ratio in that the solution becomes more concentrated near the heated surface and diluted, i.e., depleted in solute, near the cooler surface. In practice, this enables a drastic separation of solute from solvent in a wide variety of solutions using only low grade temperature levels. For example, sea water, containing NaCl, $MgCl$, $MgSO_4$, and a multiplicity of other constituents in small amounts, can be almost totally dissociated into pure drinking water at the cooler surface while a concentrated saline solution can be removed from the heated surface. The separation process can be made continuous by the continuous infusion of fresh solution into the matrix material, and the simultaneous purging of the concentrate and removal of the purified solvent through separate outlets.

The method is effective for separating constituents of a large variety of solutions, a simple limitation being that the solute be less volatile than the solvent. The process lends itself to the separation of multiphase systems including miscible substances in which one species of molecule diffuses more readily through a gaseous phase than another species is able to diffuse through a liquid phase, exemplified by the separation of water (as solute) from ethyl alcohol (as solvent). The method can also be used to concentrate the solute, exemplified by the concentration of maple sugar.

Because of the extremely large positive coefficients obtained with the process provided herein, it can be characterized as a super separation process. The low pressure diffusion flow in the interior of the cell avoids degradation of the matrix, which can be formed of inexpensive cellulose fibers. The maximum temperature of the heated surface must not exceed the boiling point of the solvent, while the lower surface may advantageously be kept at ambient temperature, say 24° C.–32° C. so that there is no need for cooling apparatus; in fact, operation is more efficient when the lower surface is not artificially cooled. The temperature difference between the upper and lower walls of the cell incorporating the matrix material can be in the range of 5° C.–80° C. Such a temperature difference can be easily achieved by utilizing surface and deep ocean water in tropical latitudes or by utilizing low-grade temperature sources to heat the upper surface, such as obtained from solar panels or from the heated effluent of industrial plants or electrical generating plants. Another advantage of the method in accordance with our invention is that clogging of the system is prevented by the continuous infusion of fresh solution, while sumultaneously the concentrated solutes are purged and the diluted solvent is withdrawn from the cell.

BRIEF DESCRIPTION OF THE DRAWING

The FIGURE is a schematic cross-sectional view of apparatus in accordance with the invention, of a size and configuration to enable the measurement of concentration coefficients.

DETAILED DESCRIPTION

In the drawing there is shown a chamber 10 defined by a vertical annular acrylic wall 12 clamped between upper and lower circular, horizontal brass walls 14 and 16 in fluid-type connection via O-ring seals 18 and 20. The interior of the chamber 10 contains a solution 22 as well as matrix material. The solution comprises one or more non-volatile solutes of organic or inorganic character dissolved in a volatile solvent and can be exemplified by sea water. The matrix 24 consists of separate juxtaposed filter sheets which in this exemplification have a thickness of 0.027 cm. The sheets are made from cellulose material which forms a fibrous aggregate, including pores permitting fluid flow from one side of the chamber to the other. The pores preferably entrain 0.07 to 0.3 ml gas per 10 sheets of filter paper of 55 mm diameter, i.e., about 1% to 5% by volume. In a particular embodiment, the matrix material 24 is made from sheets of Whatman No. 40 filter paper.

The matrix may be spaced from the upper and lower walls in the interior of the cell, but it is preferred that it be closely adjacent or touching the wall so as to obtain maximum efficiency. In the apparatus illustrated, the insertion of the matrix material 24 in the chamber 10 distinguishes the latter from a Soret cell of the prior art. The chamber 10 can have a depth between 0.2 and 20 cm, although the actual dimensions are determined by the parameters of a specific process including the time factor. Narrower chamber depths decrease the time required to establish a steady state in the solution, but the volume of solution which can be processed in a unit time must be balanced against the degree of separation of solute from solvent. Housings 26 and 28 for circulating bath water 30 and 32, respectively, as indicated also by the arrows, or other conventional heating and cooling means, are provided to maintain the upper and lower walls 14 and 16 at desired temperatures.

For an aqueous solution, the maximum and minimum temperatures under ambient pressure conditions approximate the boiling point and freezing point, respectively, of water. While operation under ambient pressure is the preferred method, the invention does not preclude the application of additional pressure, in which case considerations with respect to boiling and freezing point would be pertinent to those conditions. With ambient pressure, the temperature difference between the two surfaces for an aqueous solution is preferably kept to 5° C.–80° C., more preferably 40° C.–60° C.

An inlet port 34 for the infusion of fresh solution is provided at the mid level of the chamber in order to achieve a uniform distribution throughout the chamber and the matrix material therein. An outlet port 36 extending through the upper bath housing 26 to the heated upper wall 14 of the chamber serves to purge the concentrated solution from the chamber. An outlet port 38 extending through the lower bath housing 28 to the cooler lower wall 16 permits the discharge of the purified solvent. Appropriate lengths 40, 42 and 44 of polyethylene tubing extend into the respective ports 34, 36 and 38. Closing pins 46 and 48 close the ends of the outer tubing lengths 42 and 44, respectively, and are removable for flow of fluid. Fresh solution can be infused under slight positive pressure through the inlet port tubing 40.

In operation, the maintenance of a temperature gradient across the solution 22 in the chamber 10 gives rise to a concentration gradient which results in a solute concentration of solute at the heated upper wall 14. The magnitude of the concentration, as measured by the ratio of upper and lower concentration, is consistently and significantly greater than unity, in marked contrast to measurements obtained in a Soret cell which yields negative values for the thermal diffusion coefficient.

While it is not desired to be limited to any particular theory of operation, nevertheless an understanding of the present process may be facilitated by considering a possible mechanism for operation. In this regard, we believe the following facts are pertinent: (1) the extent of super separation appears to be about the same for solutes which are electrolytes and which are non-electrolytes; (2) vacuum extracting entrapped gases from the filter paper and dissolved gases in the solution eliminates the super separation phenomenon; and (3) the time to attain steady state solute concentrations at the heated and cooled surfaces is about three times longer when the cooler and hotter surfaces are 0° C. and 50° C., respectively, than when they are 25° C. and 75° C., respectively. On the basis of the foregoing, it is hypothesized that entrapped gas in the pores of the matrix material serves as a channel for diffusion of solvent vapor. Referring to the separation of an aqueous solution and the use of stacked sheets of filter paper as the matrix material, water evaporates with a higher vapor pressure at a higher temperature and the solution is thereby concentrated near the heated surface. Water vapor diffuses toward the cooled surface where the vapor pressure is less, and it condenses and dilutes the solution near the cooled surface. Since the diffusion coefficient for water vapor through air is approximately $10_4$ times the diffusion coefficient for solute molecules through liquid water, water vapor near the heated surface will diffuse many times more readily toward the cooled surface than the rate solute can diffuse from high to low concentration.

The vapor pressure of water increases exponentially with temperature while the temperature increases linearly from the cooled to the heated surfaces, so that the vapor pressure will therefore increase exponentially from the cooled to the heated surfaces, yielding the large separations which we have observed. When a steady state has been achieved such that the solute concentrations throughout the solution are no longer changing, it can be assumed that the rate water vapor diffuses toward the cooled surface at any distance from the cooled surface will be the same as the rate solute diffuses toward the cooled surface at that same distance. The rate of water vapor diffusion and the rate of solute diffusion will be the same and greatest at the heated surface and the same and least at the cooled surface. At the heated surface, the diffusion of water vapor is greatest because it is proportional to the vapor pressure gradient which is highest at the highest temperatures. The diffusion of solute is greatest at the heated surface because it is proportional to its concentration gradient which (according to our hypothesis and experiments) becomes greatest at the heated surface.

The time required to attain a steady state solute concentration due to thermal diffusion is a function of the absolute temperature. Within the interval 25° C.–75° C.

the steady state sets in three times as fast as within the interval of 0° C.-50° C. This differential in speed is in accord with the fact that the differential vapor pressure of water is 265 mmHg within the 25° C.-75° C. range, and only 88 mmHg for the 0° C.-50° C. range. Accordingly, operation within the higher range is advantageous. Also in accordance with the foregoing hypothesis, use of a gas in place of air in which the diffusion coefficient of water vapor is higher can shorten the time to steady state as well as increase the extent of super separation. In this regard, depending upon the economics of the particular installation, it can be advantageous to replace the air with a more advantageous gas such as hydrogen through which the diffusion coefficient of water vapor is about 3.4 times the diffusion coefficient of water through air.

The following examples will further illustrate the invention.

EXAMPLE 1

A matrix consisting of 75 sheets of Whatman No. 40 filter paper was placed into a cell as described above and depicted in the drawing, having a depth of 2 cm. The filter paper matrix was imbibed with sea water until the cell was completely filled with the sea water. The top wall of the cell was then clamped to the annular wall with the temperatures of the lower and upper baths controlled to 10° C. and 60° C., respectively, the sea water soaked matrix was allowed to remain in the cell until steady state was achieved as determined below.

In order to measure the concentration of salts at the heated surface of the cell, the wire plug was removed from the polyethylene tubing at the upper opening. A small amount of fresh sea water was infused through the middle opening into the cell by applying slight pressure to an infusion syringe containing the sea water, inserted into the outer end of the tubing. A 10 microliter sample was withdrawn from the cell through the upper tubing. The sample was collected in a 6.5 millimeter cellulose disc on a glass plate and immediately covered to protect it from evaporation. The saturated disc was introduced into the sample wall of a Wescor model 5100A vapor pressure osmometer and the osmolality of the solution was measured. Next the concentration at the lower cooled surface was measured by the same method by plugging the upper polyethylene tubing and unplugging the lower polyethylene tubing. The sequence was repeated seven times to obtain an average result. Measurements were taken periodically until a steady state was achieved, in this case 68 hours. The values shown in the Table 1 below were obtained.

Table 1

| Solu- | Temperature, ° C. | | Time | Osmolality, mosm. | | Osmolality |
|---|---|---|---|---|---|---|
| tion | Upper | Lower | hours | Upper | Lower | Ratio |
| Sea water | 60 | 10 | 68 | 5450 | 0* | ∞* |

*The values are only approximate and mean only that the separation ratio is very large.

Inspection of the data reveals a tremendous disparity between the osmolality of the resultant solution at the upper wall and that of the solution that at the lower wall. In this experiment, by subjecting sea water to a temperature difference of only 50° C., potable water was obtained at the lower surface of the cell.

EXAMPLE 2

An experiment was conducted in the manner of Example 1 but wherein the solution to be separated was a simple salt solution of 24.055 grams of sodium chloride per 1000 grams of water, having an initial osmolality of 711 mosm. After an elapsed time of 70 hours, the following results were obtained.

Table 2

| Solu- | Temperature, ° C. | | Time | Osmolality mosm. | | Osmolality |
|---|---|---|---|---|---|---|
| tion[1] | Upper | Lower | hours | Upper | Lower | Ratio |
| 24.055 NaCl (710) | 60 | 10 | 70 | 3041 | 57 | 203 |
| pure H$_2$O (42) | 60 | 10 | 24 | 46 | 44 | |

[1]gm solute/1000 gm H$_2$O; number in parenthesis is the osmolality of the solution prior to separation.

Measurements obtained for pure water are also given. The vapor pressure osmometer was found to be unreliable at osmolalities below 100 as is indicated by the measurement of 42 mosm. for pure water. Accordingly, when the osmolality at the lower surface was measured at less than 100 mosm., 42 mosm. was subtracted from the measured value in order to compute the ratio of upper to lower osmolality; therefore, the osmolality ratio given in the above table is 203.

EXAMPLE 3

The above experiment was repeated but with a temperature difference of 30° C. obtained by maintaining the upper bath at 40° C. and the lower bath at 10° C. The following results were obtained.

Table 3

| Solu- | Temperature, ° C. | | Time | Osmolality, mosm. | | Osmolality |
|---|---|---|---|---|---|---|
| tion | Upper | Lower | hours | Upper | Lower | Ratio |
| 24.055 NaCl (709) | 40 | 10 | 46 | 1493 | 220 | 6.8 |

EXAMPLE 4

Experiments as described in Example 1 were conducted but using a solution of 34.23 gms. of sucrose per 1000 gms. of water. The results are given in Table 4 below.

Table 4

| Solu- | Temperature, ° C. | | Time | Osmolality, mosm. | | Osmolality |
|---|---|---|---|---|---|---|
| tion | Upper | Lower | hours | Upper | Lower | Ratio |
| 34.23 Sucrose (1066) | 60 | 10 | 20 | 2308 | 267 | 8.9 |
| 34.23 Sucrose (1003) | 60 | 10 | 44 | 3018 | 62 | 151 |
| 34.23 Sucrose (1067) | 40 | 10 | 47 | 1886 | 441 | 4.3 |

EXAMPLE 5

An experiment was conducted in the manner of Example 1 but wherein the solution was formulated from 92.10 gms. of glycerol per 100 gms. of water.

Table 5

| Solution | Temperature, °C. Upper | Temperature, °C. Lower | Time hours | Osmolality, mosm. Upper | Osmolality, mosm. Lower | Osmolality Ratio |
|---|---|---|---|---|---|---|
| 92.10 Glycerol (968) | 60 | 10 | 22 | >2000 | 332 | >6 |
| 92.10 Glycerol (963) | 60 | 10 | 46 | >2000 | 144 | >13 |

EXAMPLE 6

To determine the effect of various modifications, the procedure of Example 1 as repeated but in which sample solutions of sodium chloride were subjected to treatment in a cell in which both top and bottom were maintained at the same temperature. Additionally, experiments were conducted in which the temperature gradient of the experiments of Examples 1–5 was inverted so that the upper wall was cooled while the lower wall was heated. A normal run was also conducted in accordance with the prior examples, for comparison purposes. The results are given below.

Table 6

| Solution | Temperature, °C. Upper | Temperature, °C. Lower | Time hours | Osmolality, mosm. Upper | Osmolality, mosm. Lower | Osmolality Ratio |
|---|---|---|---|---|---|---|
| 32.126 NaCl (979) | 25 | 25 | 18 | 912 | 1069 | 0.853 |
| 24.055 NaCl (711) | 60 | 60 | 23 | 692 | 776 | 0.892 |
| 32.126 NaCl (976) | 10 | 60 | 24 | 123 | >2000 | <0.062 |
| 32.126 NaCl (978) | 60 | 10 | 24 | >2000 | 328 | >6 |

It will be seen that a temperature gradient is critical to obtaining the desired result. Furthermore, inverting the temperature gradient simply caused the concentrations to invert, so that high concentration was always associated with the high temperature regardless of whether it was the upper or lower surface.

EXAMPLE 7

To illustrate the requirement that the matrix be gas-entraining, experiments were conducted in which the solution and matrix of Example 6 were degassed by evacuating the filter paper in the solution one half hour prior to entry into the cell. The results are given below.

Table 7

| Solution | Temperature, °C. Upper | Temperature, °C. Lower | Time hours | Osmolality, mosm. Upper | Osmolality, mosm. Lower | Osmolality Ratio |
|---|---|---|---|---|---|---|
| 32.126 gm. NaCl (1009) | 50 | 0 | 19 | 1026 | 1004 | 1.022 |
| 32.126 gm NaCl (1003) | 50 | 0 | 87 | 997 | 1012 | 0.985 |

It will be seen that even after an elapsed time of 87 hours, nothing but a Soret-type coefficient was obtained.

EXAMPLE 8

Experiments were conducted as in Example 6 but in which various materials other than Whatman filter paper were used as the matrix material. In each case, the example reported here had the longest lapsed time in that series of runs. In the table, adjacent the osmolality of the fresh solution, there is given the nature of the matrix material or there is indicated that no matrix material was present. In the latter case, the measurement is that of a traditional Soret coefficient.

Table 8

| Solution | Temperature, °C. Upper | Temperature, °C. Lower | Time hours | Osmolality, mosm. Upper | Osmolality, mosm. Lower | Osmolality Ratio |
|---|---|---|---|---|---|---|
| 32.126 NaCl (972) - Gelman Metricel Type GM-6 | 60 | 10 | 96 | 1401 | 1049 | 1.34 |
| 32.126 NaCl (997) - unbleach muslin | 50 | 0 | 16 | 959 | 1007 | 0.952 |
| 32.16 NaCl (988) - Air Filter | 60 | 10 | 48 | 946 | 1030 | 0.918 |
| 32.16 NaCl +10 gm. Gelatin (1020) - Air Filter | 60 | 10 | 91 | 964 | 1071 | 0.900 |
| 34.23 Sucrose (1080) - Air Filter | 60 | 10 | 44 | 1001 | 1129 | 0.887 |
| 34.23 Sucrose (1036) - glass beads | 65 | 15 | 72 | 959 | 1148 | 0.835 |
| 342.3 Sucrose (1076) - no matrix | 65 | 15 | 144 | 979 | 1130 | 0.866 |
| 74.56 KCl (1718) - no matrix | 65 | 15 | 48 | 1695 | 1781 | 0.952 |

An inspection of Table 8 reveals that the reversal is only modest for Gelman Metricel. In other cases, as with the unbleached muslin, the air filter and the glass beads, a result is obtained which is not substantially different from that obtained when no matrix is present, i.e., the only effect seen is that of the expected Soret coefficient.

EXAMPLE 9

To illustrate the effect of substituting a gaseous material, the experiment of Example 1 was repeated but in which the matrix and the sodium chloride solution were separately evacuated for one hour and then saturated with hydrogen gas. The experiment was run for only 2 hours and not for a time sufficient to achieve a steady state; nevertheless, a ratio of 9.4 was obtained in such a short time, which is believed to be a manifestation of the fact that hydrogen has a diffusion coefficient for water vapor which is 3.4 times larger than the diffusion coefficient of air for water vapor, and supporting the hypothesis given above. The following table lists the results.

Table 9

| Solution | Temperature, °C. Upper | Temperature, °C. Lower | Time hours | Osmolality, mosm. Upper | Osmolality, mosm. Lower | Osmolality Ratio |
|---|---|---|---|---|---|---|
| 32.126 NaCl (1034) | 50 | 10 | 2 | 3376 | 360 | 9.4 |

EXAMPLE 10

An experiment was conducted in accordance with Example 1 but in which the solution was 4.5 weight percent ethyl alcohol in water. In this case, the water molecules act as solute and the ethyl alcohol as solvent and therefore it is listed as such in the Table. The results obtained are as follows.

Table 10

| Solution | Temperature, °C. | | Time hours | Osmolality, mosm. | | Osmolality Ratio |
| --- | --- | --- | --- | --- | --- | --- |
| | Upper | Lower | | Upper | Lower | |
| 47.2 gm. Ethanol/ 100 gm. H$_2$O | 50 | 0 | 43 | 632 | 1319 | 0.48 |

We claim:

1. A method for the separation of volatile solvent from a solution of said solvent and a relatively non-volatile solute, comprising:
    infiltrating with said solution a matrix material capable of absorbing said solvent and having pores and gas entrained therein to at least 1% by volume of said matrix material;
    providing a temperature difference across said matrix material to define hotter and cooler sides thereof and having a sufficient magnitude to obtain solution concentrated with said solute adjacent said hotter side and solution diluted with said solvent adjacent said cooler side, said matrix material substantially occupying the region between said hotter and cooler sides;
    removing concentrated solution from said hotter side; and
    removing diluted solution from said cooler side.

2. The method of claim 1 wherein said matrix is disposed with its hotter side vertically above its cooler side.

3. The method of claim 1 wherein said temperature difference is in the range of 5° C.-80° C. across said matrix material.

4. The method of claim 1 wherein said matrix material has a dimension between said hotter and cooler sides of about 0.2-20 cm.

5. The method of claim 1 wherein said matrix material comprises a plurality of separate sheets made from cellulose fibers, each sheet being porous.

6. The method of claim 5 wherein said sheets are filter paper.

7. The method of claim 1 wherein said solvent comprises water.

8. The method of claim 1 wherein said solute comprises an inorganic salt.

9. The method of claim 1 wherein said solution is sea water.

10. The method of claim 1 wherein said solute comprises an organic compound.

11. The method of claim 10 wherein said solute is maple sugar.

12. The method of claim 1 wherein said solute is water and said solvent is ethyl alcohol.

13. The method of claim 1 in which said gas is air.

14. The method of claim 1 operated in a continuous manner by continuously infusing said solution into said matrix.

15. The method of claim 14 in which said solution is infused at a location between said hotter and cooler sides.

16. The method of claim 1 in which said pores entrain gas to 1% to 5% of the volume of said matrix.

17. The method of claim 1 in which said matrix material is disposed within a chamber having walls adjacent or touching said hotter and cooler sides.

18. A method for the desalination of sea water, comprising:
    disposing matrix material in a chamber adjacent or touching upper and lower walls of said chamber, said matrix material being capable of absorbing said sea water and having pores and entrained gas therein to at least 1% by volume of said matrix material;
    infiltrating said matrix material with sea water;
    providing a temperature gradient across said matrix material to define a hotter side adjacent said upper chamber wall and a cooler side adjacent said lower chamber wall, whereby to concentrate said sea water adjacent said hotter side and dilute said sea water adjacent said cooler side;
    removing said concentrated saline solution from said hotter side; and
    removing desalinated sea water from said cooler side.

19. Apparatus for the separation of volatile solvent from a solution of said solvent and a relatively non-volatile solute, comprising:
    a matrix material capable of absorbing said solvent and having pores and entrained gas therein to at least 1% by volume of said matrix material;
    means for infiltrating said matrix material with said solution;
    means for providing a temperature difference across said matrix material to define hotter and cooler sides thereof, whereby to concentrate said solution adjacent said hotter side and dilute said solution adjacent said cooler side, said matrix material substantially occupying the region between said hotter and cooler sides;
    means for removing concentrated solution from said hotter side; and
    means for removing diluted solution from said cooler side.

20. The apparatus of claim 19 wherein said matrix is disposed with its hotter side vertically above its cooler side.

21. The apparatus of claim 19 wherein said temperature difference to be provided is in the range of 5° C.-80° C. across said matrix material.

22. The apparatus of claim 19 wherein said matrix material has a dimension between said hotter and cooler sides of about 0.2-20 cm.

23. The apparatus of claim 19 wherein said matrix material comprises a plurality of separate sheets made from cellulose fibers, each sheet being porous.

24. The apparatus of claim 23 wherein said sheets are filter paper.

25. The apparatus of claim 19 wherein said gas is air.

26. The apparatus of claim 19 including means for flushing said matrix material with a gas other than air for entrainment thereof in the pores of said matrix material.

27. The apparatus of claim 26 in which said gas is hydrogen.

28. The apparatus of claim 19 in which said infiltrating means is formed to infuse said solution at a location between said hotter and cooler sides.

29. The apparatus of claim 21 in which said pores entrain gas to 1% to 5% of the volume of said matrix.

30. The apparatus of claim 21 including a chamber for containing said matrix material and having walls adjacent or touching said hotter and cooler sides.

31. Apparatus for the separation of volatile solvent from a solution of said solvent and a relatively non-volatile solute, comprising:

a chamber having upper and lower walls;

matrix material in said chamber adjacent or touching said upper and lower walls and capable of absorbing solvent, said matrix material having pores and entrained gas therein to at least 1% by volume of said matrix material;

means for infiltrating said matrix material with solution to be separated;

means for providing a temperature difference across said matrix material to define a hotter side adjacent said upper chamber wall and a cooler side adjacent said lower chamber wall whereby to concentrate said solution adjacent said hotter side and dilute said solution adjacent said cooler side;

means for removing concentrated solution from said hotter side; and means for removing diluted solution from said cooler side.

32. A method for the separation of volatile solvent from a solution of said solvent and a relatively non-volatile solute, comprising:

infiltrating with said solution a porous matrix material capable of absorbing said solvent;

flushing said matrix material with a gas other than air for entrainment thereof in the pores of said matrix material;

providing a temperature difference across said matrix material to define hotter and cooler sides thereof, whereby to obtain solution concentrated with said solute adjacent said hotter side and solution diluted with said solvent adjacent said cooler side;

removing concentrated solution from said hotter side; and removing diluted solution from said cooler side.

33. The method of claim 32 in which said gas is hydrogen.

* * * * *

UNITED STATES PATENT AND TRADEMARK OFFICE
CERTIFICATE OF CORRECTION

PATENT NO. : 4,153,546

DATED : May 8, 1979

INVENTOR(S) : Harold T. Hammel, James E. Maggert

It is certified that error appears in the above-identified patent and that said Letters Patent are hereby corrected as shown below:

Column 2, line 66, delete "sumultaneously" and substitute --simultaneously--.

Column 5, line 44, delete "wall" and substitute --well--.

Signed and Sealed this

Sixteenth Day of October 1979

[SEAL]

Attest:

RUTH C. MASON
Attesting Officer

LUTRELLE F. PARKER
Acting Commissioner of Patents and Trademarks